Figure 1:
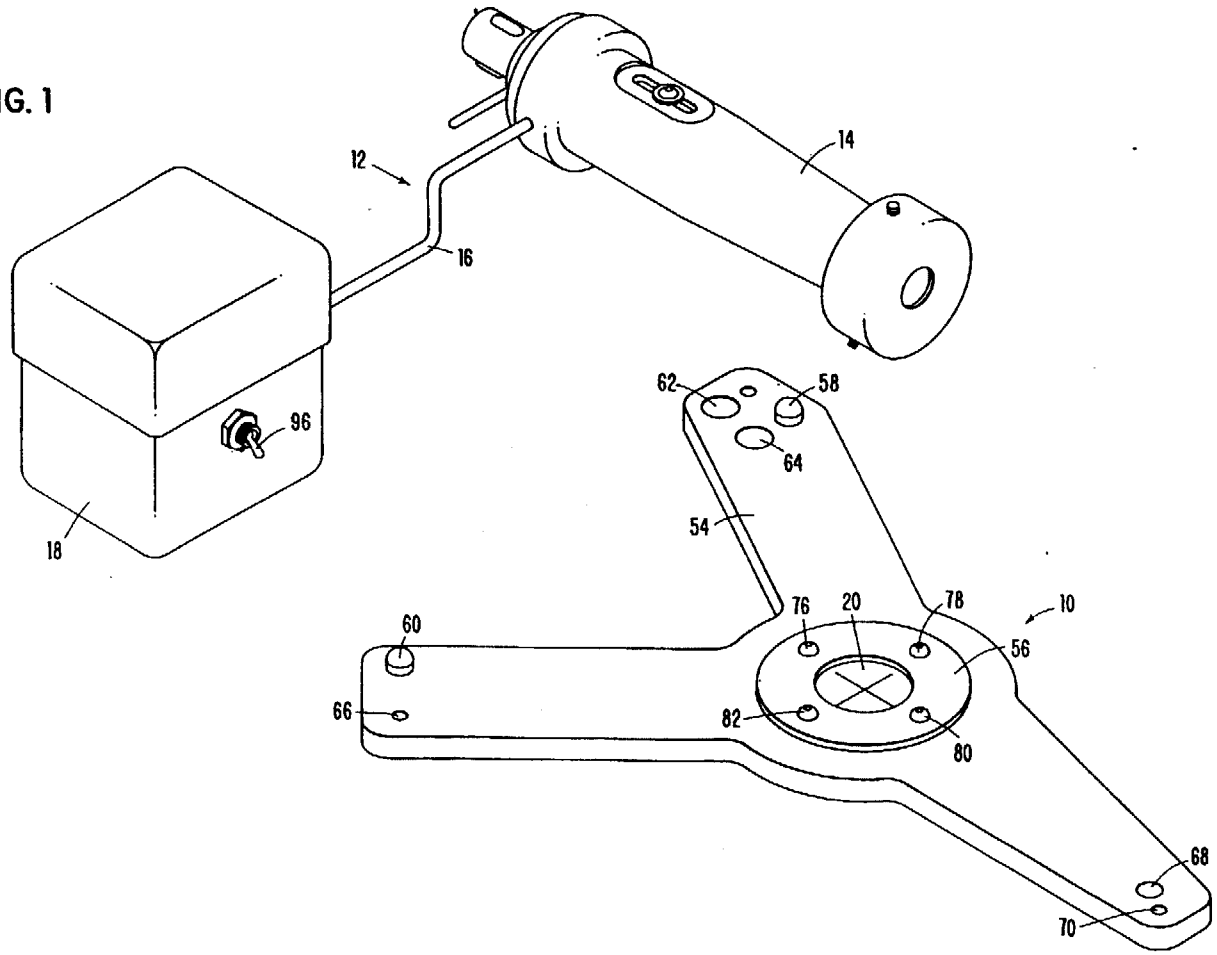

United States Defensive Publication [19] (H) [11] T109,201

Jones [43] Jul. 5, 1988

[54] OPTICAL ALIGNMENT TOOL

[75] Inventor: Lee E. Jones, Richmond, Vt.

[73] Assignee: International Business Machines, Armonk, N.Y.

[21] Appl. No.: 378,979

[22] Filed: May 17, 1982

[51] Int. Cl.[3] ..... C01B 11/00

[52] U.S. Cl. ..... 356/153

[57] ABSTRACT

An optical alignment tool and method is described for setting a datum line in a copier. The datum line is used as the reference for aligning a plurality of copier components. The alignment tool includes a light source fixedly mounted to an adjustable support which is positioned at one end of the datum line. A cross-hair target comprising of two mutually perpendicular lines is attached to a fixed support at the other end of the datum line. The orientation between the fixed support and the adjustable support is such that when the light beam is positioned at the centerpoint of the cross-hair target, the datum line is established. The adjustable support is locked into place. The light source and target are removed and replaced with the copier components.

Also disclosed is a calibration master "jig" for calibrating the light source. The jig includes a cross-hair target of two mutually perpendicular lines disposed at one end. The light source is mounted at the opposite end of the jig. The light source is adjusted until the beam is centered on the cross-hair target. The adjustable section of the light source is first locked into place and the light source is removed from the jig.

8 Claims, 4 Sheets Drawing,

15 Pages Specification

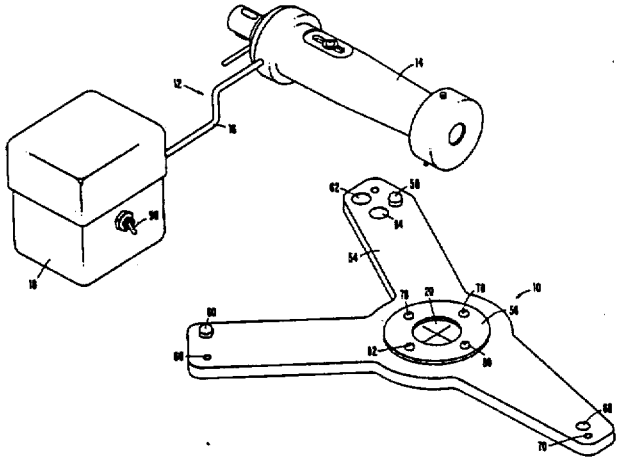

The file of this unexamined application may be inspected and copies thereof may be purchased (849 O.G. 1221, Apr. 9, 1968).